United States Patent [19]

Tytgat et al.

[11] Patent Number: 4,783,381
[45] Date of Patent: Nov. 8, 1988

[54] PROCESS FOR THE PRODUCTION OF ELECTRICITY IN A FUEL CELL, AND FUEL CELL

[75] Inventors: Daniel Tytgat, Brussels; Marianne Reignier, Nivelles; François Dujardin, Brussels, all of Belgium

[73] Assignee: Interox (Société Anonyme), Brussels, Belgium

[21] Appl. No.: 71,494

[22] Filed: Jul. 9, 1987

[30] Foreign Application Priority Data

Jul. 9, 1986 [FR] France .................. 86 10144

[51] Int. Cl.$^4$ ............................................. H01M 8/04
[52] U.S. Cl. ........................................ 429/15; 429/17; 429/19; 429/46
[58] Field of Search ...................... 429/13-15, 429/17, 19, 46, 12

[56] References Cited

U.S. PATENT DOCUMENTS

| | | | |
|---|---|---|---|
| 3,092,516 | 6/1963 | Rightmire | 429/13 |
| 3,202,546 | 8/1965 | Rightmire et al. | 429/34 |
| 3,231,428 | 1/1966 | Thompson | 429/34 |
| 3,261,716 | 7/1966 | Roblee, Jr. et al. | 429/46 X |
| 3,446,671 | 5/1969 | Kring | 429/46 |
| 3,513,032 | 5/1970 | Warszawski | 429/34 |
| 3,657,015 | 4/1972 | Veatch et al. | 429/17 |
| 3,758,339 | 9/1973 | Manion | 429/46 X |

FOREIGN PATENT DOCUMENTS 1062094 3/1967 United Kingdom .

Primary Examiner—Anthony Skapars
Attorney, Agent, or Firm—Spencer & Frank

[57] ABSTRACT

Hydrogen peroxide (8) is introduced at the interface of an anode (5) and an alkaline anolyte (3) of a fuel cell containing, in addition, an acid catholyte (4), isolated from the anolyte by a separator which is permeable to ions (2).

12 Claims, 2 Drawing Sheets

PROCESS FOR THE PRODUCTION OF ELECTRICITY IN A FUEL CELL, AND FUEL CELL

The invention relates to fuel cells.

It relates in particular to a process for the production of electricity, using a fuel cell.

In order to produce electrical energy by means of a fuel cell, the anode/anolyte and cathode/catholyte interfaces of the cell are fed with a fuel and an oxidising agent respectively. According to document US-A-3657015, a fuel cell is used in which the anode compartment and the cathode compartment are isolated by a separator which is permeable to ions and contain an alkaline anolyte and an acid catholyte respectively, the fuel used being hydrazine and the oxidising agent being nitric acid. This known process has the disadvantage of generating nitrogen oxides, which are toxic. It involves, moreover, the use of an expensive fuel.

According to document US-A-3446671, a fuel cell is used in which the anolyte and the catholyte are both acids, and a peroxy compound (preferably hydrogen peroxide) is used as the oxidising agent and an alcohol is used as the fuel. This known process also requires an expensive fuel and it generates carbon dioxide in the atmosphere.

The invention overcomes these disadvantages by providing a new, easy and economic process for the production of electricity by the fuel cell method, which process does not generate any toxic or polluting products.

Consequently, the invention relates to a process for the production of electricity according to which a fuel and an oxidising agent are introduced into a fuel cell respectively at the interface of an anode and an alkaline anolyte of the cell and at the interface of a cathode and an acid catholyte isolated from the alkaline anolyte by a separator which is permeable to ions; according to the invention, hydrogen peroxide is used as the fuel.

In the process according to the invention, the anode and the cathode of the fuel cell must be made of a material which conducts electricity and is chemically inert towards the electrolytes, the fuel and the oxidising agent. They can, for example, be made of graphite, carbon, a metal selected from the transition elements of the periodic table of elements such as nickel, ruthenium, platinum and gold, for example, or an alloy containing at least one of these elements, for example palladium-gold alloys. Other examples of electrodes that can be used within the scope of the invention are those containing a support made of a film-forming material (selected from titanium, zirconium, hafnium, vanadium, niobium, tantalum and alloys of these metals) and a conductive coating containing an oxide of at least one metal selected from platinum, palladium, iridium, rhodium, osmium and ruthenium, as described in documents FR-A-1479762 and FR-A-1555960 (H. B. Beer). Electrodes of this kind, especially recommended, are those in which the coating contains a compound having the general formula $Rh_2TeO_6$, $Rh_2WO_6$, $Rh_2MoO_6$ or $RhSbO_4$ (documents FR-A-2099647, 2099648, 2099649, 2121511, 2145485—SOLVAY & Cie). In these electrodes, the support made of a film-forming material may possibly surround a core made of a material which is a better conductor of electricity such as copper or aluminium.

The function of the separator is to separate physically the acid catholyte and the alkaline anolyte whilst permitting the passage of ions. To this end, it can be an inert microporous membrane, for example made of a fluorinated polymer such as polyvinylidene fluoride or polytetrafluoroethylene. It is preferable to use a membrane with selective permeability to anions or cations, for example, a cationic membrane sold commercially under the trade-name "NAFION" (Du Pont) which is a perfluorinated polymer sheet containing functional groups derived from sulphonic acid.

In the fuel cell used in accordance with the invention, the anolyte is an alkaline electrolyte and the catholyte is an acid electrolyte. All other things being equal, the greater the difference between the pH of the anolyte and the pH of the catholyte, the higher the voltage obtained at the terminals of the cell. It is generally desirable for this pH difference to be at least 7 and preferably more than 10.

Moreover, in accordance with a particular embodiment of the process according to the invention, it is advantageous to maintain in the anode compartment a pH value of more than 11.63, which is the pH corresponding to a dissociation of 50% of the hydrogen peroxide according to the equation $$H_2O_2 \rightleftharpoons HO_2^- + H^+$$

The preferred pH values are those in excess of 13 in the anode compartment and below 2 in the cathode compartment. To this end, the anolyte can be, for example, an aqueous solution of alkali metal hydroxide and the catholyte can be, for example, an aqueous solution of hydrochloric acid or sulphuric acid, to which solution phosphoric acid is possibly added. Concentrated aqueous solutions of sodium hydroxide and sulphuric acid are preferred.

According to the invention, hydrogen peroxide is used as the fuel at the anode of the fuel cell.

Although not wishing to be bound by a theoretical explanation, the inventors consider that the electromechanical reaction at the anode is as follows: $HO_2^- + OH^- \rightarrow O_2 \uparrow + H_2O + 2e^-$ The process according to the invention has, therefore, the advantageous characteristic of generating oxygen which can easily be put to good effect.

In the process according to the invention, hydrogen peroxide can be used in the pure state or in the form of an aqueous solution. Commercial aqueous solutions containing approximately 70% by weight hydrogen peroxide are suitable.

The process according to the invention can be carried out at all temperatures and pressures that are compatible with the stability of hydrogen peroxide and the maintaining the electrolytes in the liquid state. It is carried out preferably at a temperature not exceeding 60° C., ambient temperature being particularly advantageous.

In a particular embodiment of the process according to the invention, intended to improve its yield, a stabiliser for hydrogen peroxide is incorporated in the alkaline anolyte of the anode compartment. The stabiliser is chosen preferably from polyols; examples of preferred polyols are glycerine, polyethylene glycol and ethylene glycol.

In a particularly advantageous embodiment of the process according to the invention, hydrogen peroxide is used both as the fuel at the anode and as the oxidising agent at the cathode.

Although not wishing to be bound by a theoretical explanation, the inventors consider that the electrochemical reaction at the cathode is as follows:

$$H_2O_2 + 2H^+ + 2e^- \rightarrow 2H_2O$$

This embodiment of the process according to the invention has therefore the remarkable and advantageous characteristic of not liberating toxic or polluting products.

In a variant of this embodiment of the process according to the invention, electroactive ions selected from the ions $Fe^{3+}$, $Cu_2^+$ and $UO_2^+$ are introduced into the acid catholyte.

In the above-mentioned embodiment of the process according to the invention, the electrochemical reactions of hydrogen peroxide at the anode and at the cathode result in a gradual increase in the pH of the catholyte and a fall in the pH of the anolyte, which implies that the electrolytes must be regenerated. Regeneration of the electrolytes can be carried out periodically or continuously, whilst ensuring that the pH values are kept at the set values. According to the invention, an advantageous method of regenerating the anolyte and catholyte of the fuel cell consists in causing them to circulate respectively in the cathode compartment and in the anode compartment of a second fuel cell fed with a hydrogen compound as the fuel. In this method of regeneration, the fuel used in the second cell must be a hydrogen compound capable of liberating protons at the anode. It can be, for example, methane, hydrazine or, preferably, hydrogen. The oxidising agent can be, for example, air, oxygen or hydrogen peroxide. In a particularly advantageous method of carrying out this embodiment of the invention, the electrolytes are made to circulate continuously between the two fuel cells and the oxidising agent needed for the operation of the second cell is oxygen produced in the first cell and/or hydrogen peroxide entrained in the electrolyte originating from the anode compartment of the first cell.

The invention also relates to a fuel cell using the process according to the invention, said cell consisting of a container divided by a separator, which is permeable to ions, into an anode compartment containing an alkaline anolyte and a cathode compartment containing an acid catholyte, and means for admitting a fuel into the anode compartment and an oxidising agent into the cathode compartment, the fuel being hydrogen peroxide.

In a preferred embodiment of the fuel cell according to the invention, the oxidising agent of the fuel cell is hydrogen peroxide. In a particularly advantageous variant of this embodiment of the fuel cell according to the invention, the anode and cathode compartments of the fuel cell are connected respectively to an apparatus for regenerating the alkaline anolyte and an apparatus for regenerating the acid catholyte; the apparatus for regenerating the anolyte and the apparatus for regenerating the catholyte are respectively the cathode compartment and the anode compartment of a second fuel cell fed with hydrogen as the fuel and with oxygen or hydrogen peroxide as the oxidising agent. In the second cell, the use of a gaseous fuel implies that the anode is a porous electrode. If the oxidising agent chosen is air or oxygen, the cathode must also be a porous electrode.

Characteristics and details of the invention will be deduced from the following description of some embodiments, with reference to the attached drawings.

In these figures, the same reference notations denote identical components.

Figure 1:
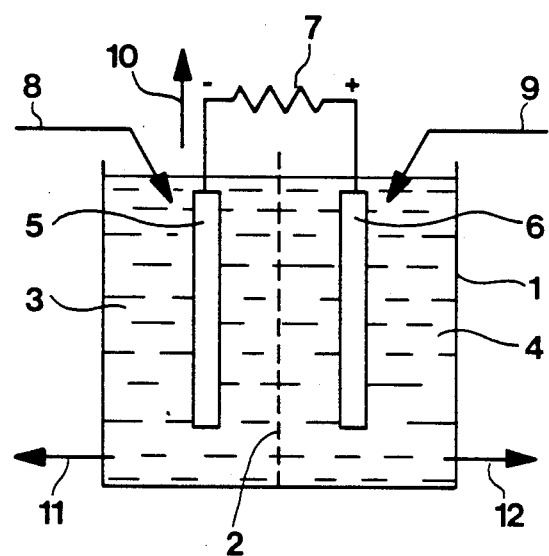
FIG. 1 is a diagram of a fuel cell using the process according to the invention.

The fuel cell 1 shown diagrammatically in FIG. 1 comprises a container divided by a separator 2 into two compartments, an anode compartment 3 and a cathode compartment 4 respectively. Separator 2 is a membrane which is permeable to ions; it is advantageously a cationic membrane formed from a perfluorinated polymer containing sulphonic functional groups, for example, a "NAFION" membrane (Du Pont).

The anode compartment 3 contains an anode 5 and the cathode compartment 4 contains a cathode 6. Anode 5 and cathode 6 are, for example, rods or plates made of titanium having a coating made of a material having the general formula $RhSbO_4$, $RuO_2$ as described in document FR-A-2145485 (SOLVAY & Cie).

The anode compartment 3 contains an aqueous solution of sodium hydroxide and the cathode compartment 4 contains an aqueous solution of sulphuric acid.

According to the invention, in order to generate an electric current in resistor 7 joining electrodes 5 and 6, aqueous solutions of hydrogen peroxide 8 and 9 are introduced continuously and simultaneously into anode compartment 3 and cathode compartment 4, and the oxygen 10 produced at the anode and fractions 11 and 12 of the anolyte and catholyte are evacuated in order to keep the levels of the electrolytes substantially constant in chambers 3 and 4.

Figure 2:
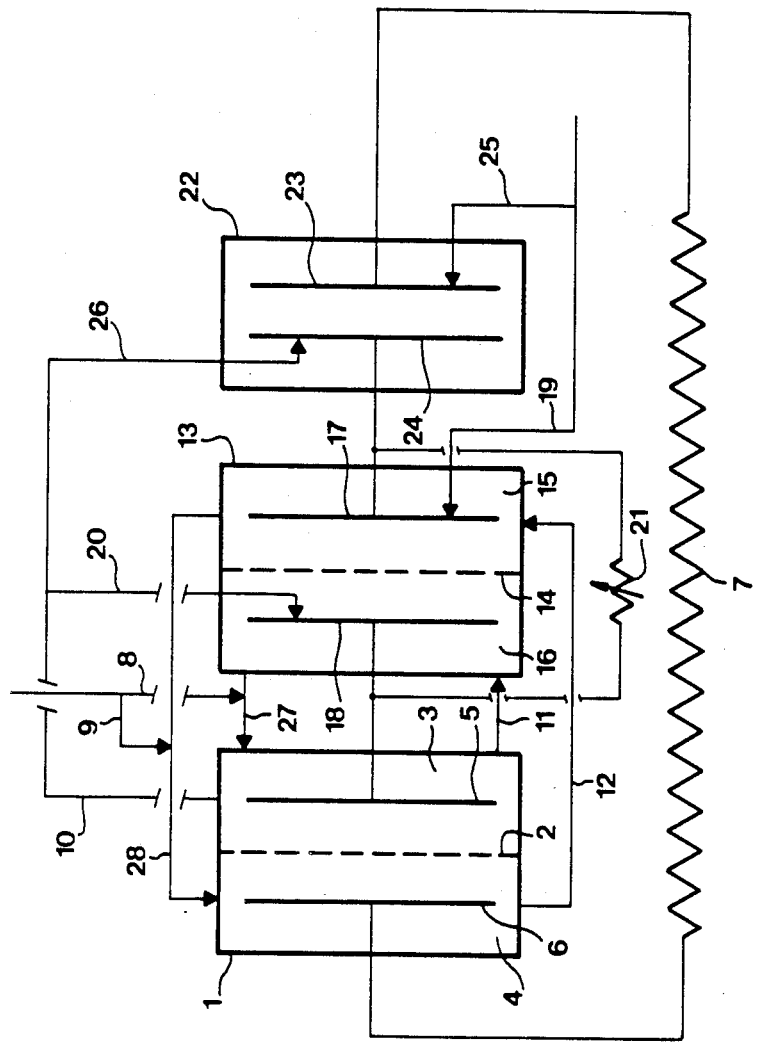
FIG. 2 is a diagram of a plant with three fuel cells using a particular embodiment of the invention.

The installation shown in FIG. 2 is composed of the fuel cell 1 described above and two additional fuel cells referred to as 13 and 22.

Cell 13 is divided by a membrane which is permeable to ions 14 into two compartments, the anode compartment 15 and the cathode compartment 16 respectively, containing an anode 17 and a cathode 18.

Cell 22 is a fuel cell of the oxygen/hydrogen type. It comprises a single container containing an acid electrolyte (for example, a concentrated aqueous solution of phosphoric acid) in which an anode 23 and a cathode 24 are immersed.

Electrodes 17, 18, 23 and 24 of cells 13 and 22 are porous electrodes well known in the art, of which the electroactive side can be a material of the same type as those mentioned above for electrodes 5 and 6 of cell 1. Electrodes 5 and 18 on the one hand, and 17 and 24 on the other are connected to each other in such a way that the three cells are connected in electrical series.

In conformity with the process according to the invention, whilst the plant of FIG. 2 is in operation, the electrolytes are made to circulate permanently between the anode compartment 3 of cell 1 and the cathode compartment 16 of cell 13 via circuit 11 and 27 on the one hand, and between the cathode compartment 4 of cell 1 and the anode compartment 15 of cell 13 via circuit 12 and 28 on the other hand. Aqueous solutions of hydrogen peroxide 8 and 9 are introduced into the anode compartment 3 and cathode compartment 4 of cell 1, a fraction of the stream of oxygen 10 generated at anode 5 of cell 1 is removed and introduced as an oxidising agent into cathode 18 of cell 13; simultaneously, hydrogen 19 is introduced as a fuel into anode 17 of cell 13. Simultaneously, porous electrodes 23 and 24 of fuel cell 22 are fed with hydrogen 25 and with the remaining fraction 26 of the stream of oxygen 10. The electrical energy is collected in a receiver shown diagrammatically by resistor 7 connecting electrodes 6 and 23.

In the plant shown in FIG. 2, the electrochemical reactions at electrodes 17 and 18 of cell 13 are as follows:

At the anode: 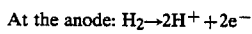

At the cathode: 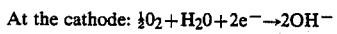

Their effect is to regenerate the electrolytes of cell 1.

The plant can contain to advantage an adjustable resistor 21 shunt connected to cell 13. By adjusting in a suitable manner resistor 21 and the electrolyte flows between the two cells 1 and 13 via circuits 11 and 27, 12 and 28, suitable pH values are achieved in compartments 3 and 4 of cell 1.

When operating the plant of FIG. 2, it is necessary to provide galvanic interrupters, which are not shown, in circuits 11, 27, 12 and 28 of the electrolytes in order to prevent shortcircuiting of cells 1 and 13. A decomposition catalyst for hydrogen peroxide, not shown, is also incorporated in circuit 12 in order to prevent this reagent being introduced into anode compartment 15 of cell 13.

In a modified embodiment, not shown, of the plant of FIG. 2, circuit 11 does not contain a decomposition catalyst for hydrogen peroxide and cathode 18 of cell 13 is not in contact with an intake of oxygen 20. In this plant, the oxidising agent used in cell 13 is the hydrogen peroxide contained in the electrolyte originating from anode compartment 3 of cell 1 and introduced into cell 13 via circuit 11.

The following examples will reveal the possibilities of the process and of the fuel cell according to the invention.

EXAMPLE 1

A cell was used containing, in a container:

a cathode formed from a titanium gauze having an active coating composed of a mixture of titanium dioxide and ruthenium oxide in equimolar quantities; the cathode had a total active surface area of 40 cm$^2$;

an anode formed from a carbon disc 60 mm in diameter and 5 mm thick, perforated by 32 holes 4 mm in diameter and having a total surface area of 74.9 cm$^2$;

a membrane with selective permeability of the cationic type placed between the anode and the cathode and composed of a perfluorinated polymer sheet containing sulphonic groups, of the trade-name NAFION 110X (Du Pont). The distance between the anode and the cathode was 1 cm.

The following were introduced into the cell:

1 l of an aqueous solution of nitric acid (8 moles/l), in the cathode compartment;

1 l of an aqueous solution of potassium hydroxide (3 moles/l), containing polyethylene glycol, in the anode compartment;

20 g of hydrogen peroxide in the anode compartment as fuel.

A temperature of approximately 20° C. was maintained in the cell.

The following were measured as a function of the intensity of the current produced by the cell:

the potential difference (U) at the terminals of the cells;

the available power of the cell.

With a current intensity of nil (open circuit), the measurement was U=1.16 V.

With an anode current density of 10.0 mA/cm$^2$, the measurements were:

U=0.65 V

Available power=0.51 W.

EXAMPLE 2

In this example, hydrogen peroxide was used both as the fuel and as the oxidising agent. To this end, a cell containing the following was used:

a cathode composed of a titanium gauze having a coating of oxides of ruthenium, rhodium and antimony having the general formula 2RuO$_2$.RhSbO$_4$; the cathode had a total surface area of 40 cm$^2$;

an anode composed of a titanium gauze having a coating of oxides of rhodium and antimony having the general formula RhSbO$_4$; the total active surface area of the anode was 40 cm$^2$;

a membrane identical to the one in the cell of example 1. A distance of 1 cm separated the anode from the cathode. The following were introduced into the cell: as the catholyte: 1 liter of an aqueous solution containing 3 moles of sulphuric acid and 5 g of ferric ions; as the anolyte: 1 liter of an aqueous solution containing 3 moles of potassium hydroxide and polyethylene glycol.

The temperature being kept at approximately 20° C., hydrogen peroxide was introduced simultaneously into the anode compartment and the cathode compartment in a quantity of 20 g per compartment. The following measurements were taken:

| | |
|---|---|
| for a current intensity of nil: potential difference | = 0.91 V; |
| for an anode current density of 32.0 mA/cm$^2$: | |
| potential difference | = 0.50 V |
| available power | = 0.65 W |
| for an anode current density of 10.0 mA/cm$^2$: | |
| potential difference | = 0.80 V |
| available power | = 0.32 W |

We claim:

1. Process for the production of electricity according to which a fuel and an oxidising agent are introduced into a fuel cell respectively at the interface of an anode and an alkaline anolyte of the cell and at the interface of a cathode and an acid catholyte isolated from the alkaline anolyte by a separator which is permeable to ions, characterised in that hydrogen peroxide is used as the fuel.

2. Process according to claim 1, characterised in that hydrogen peroxide is used as the oxidising agent.

3. Process according to claim 1, characterised in that a difference of at least 7 is maintained between the pH of the alkaline anolyte and the pH of the acid catholyte.

4. Process according to claim 3, characterised in that the pH of the alkaline anolyte is maintained at a value at least equal to 11.63.

5. Process according to claim 4, characterised in that the pH of the alkaline anolyte is maintained at a value at least equal to 13 and the pH of the acid catholyte at a value equal to a maximum of 2.

6. Process according to claim 2, characterised in that the alkaline and acid electrolytes are respectively an aqueous solution of sodium hydroxide and an aqueous solution of sulphuric acid and the separator is a cationic membrane composed of a perfluorinated polymer containing functional groups derived from sulphonic acid.

7. Process according to claim 2, characterised in that a stabiliser for hydrogen peroxide selected from polyols is added to the alkaline anolyte and electroactive ions selected from the ions $Fe^{3+}$, $Cu^{2+}$ and $UO^+_2$ are introduced into the acid catholyte.

8. Process according to claim 2, characterised in that the alkaline and acid electrolytes are regenerated by being made to circulate respectively in the cathode compartment and the anode compartment of a second fuel cell in which hydrogen is used as the fuel and oxygen and/or hydrogen peroxide is used as the oxidising agent.

9. Process according to claim 8, characterised in that the oxygen used in the second fuel cell is removed from a stream of oxygen generated in the first fuel cell, the remainder of the oxygen stream being used as the oxidising agent in a third fuel cell.

10. Fuel cell comprising a container divided by a separator which is permeable to ions into an anode compartment containing an alkaline anolyte and a cathode compartment containing an acid catholyte, and means for admitting a fuel into the anode compartment and an oxidising agent into the cathode compartment, characterised in that the fuel is hydrogen peroxide.

11. Cell according to claim 10, characterised in that the oxidising agent is hydrogen peroxide.

12. Cell according to claim 11, characterised in that it is connected to an apparatus for regenerating the anolyte and the catholyte, this apparatus consisting of a second fuel cell fed with hydrogen as the fuel and oxygen and/or hydrogen peroxide as the oxidising agent, the anode compartment and the cathode compartment of one of the two cells being in communication respectively with the cathode compartment and the anode compartment of the other cell.

* * * * *